(12) United States Patent
Tamura et al.

(10) Patent No.: US 10,866,255 B2
(45) Date of Patent: Dec. 15, 2020

(54) DISPOSAL CONTAINER FOR TESTING APPARATUS AND TESTING APPARATUS

(71) Applicant: SYSMEX CORPORATION, Kobe (JP)

(72) Inventors: Nobuya Tamura, Kobe (JP); Hiroki Koike, Kobe (JP); Toru Nishikawa, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 695 days.

(21) Appl. No.: 15/362,940

(22) Filed: Nov. 29, 2016

(65) Prior Publication Data

US 2017/0153258 A1 Jun. 1, 2017

(30) Foreign Application Priority Data

Nov. 30, 2015 (JP) ................. 2015-234276

(51) Int. Cl.
*G01N 35/02* (2006.01)
*G01N 35/00* (2006.01)
(Continued)

(52) U.S. Cl.
CPC ............. *G01N 35/021* (2013.01); *B65D 3/28* (2013.01); *B65D 25/14* (2013.01); *B65D 25/34* (2013.01);
(Continued)

(58) Field of Classification Search
CPC .......... G01N 35/021; G01N 35/00029; G01N 21/78; G01N 35/1002; G01N 21/8483; G01N 2035/0498; G01N 35/1004; B65D 47/265; B65D 3/28; B65D 25/14; B65D 25/34; B65D 25/54; B65D 43/14; B65D 77/06; B65D 11/00; B65D 2543/00101; B65D 2543/00194; B65D 2543/00268; B65D 5/563; A61M 5/3205; A61M 5/002; A61M 5/3278; A61M 2205/583; A61B 50/362; A61B 50/36; A61B 2050/0056; A61B 17/06061; A61B 17/06161;
(Continued)

(56) References Cited

U.S. PATENT DOCUMENTS 5,058,957 A * 10/1991 Fell ........................... B65F 1/12
298/24
5,245,117 A * 9/1993 Withers .............. A61M 5/3205
206/366

(Continued)

FOREIGN PATENT DOCUMENTS

JP 2001-153874 A 6/2001

*Primary Examiner* — Sally A Merkling
(74) *Attorney, Agent, or Firm* — Metrolex IP Law Group, PLLC (57) ABSTRACT

Disclosed is a testing apparatus comprising a disposal container body comprising: a first opening portion that faces upward to receive a used test piece dropped by a test piece transfer part of the testing apparatus, wherein the test piece transfer part is configured to transfer the used test piece to the first opening portion; and a second opening portion that faces laterally to receive a liquid waste and to which an end of a discharge pipe of the testing apparatus is inserted, wherein the discharge pipe is configured to transfer the liquid waste to the second opening portion.

9 Claims, 10 Drawing Sheets (51) Int. Cl.
*B65D 3/28* (2006.01)
*B65D 25/14* (2006.01)
*B65D 25/34* (2006.01)
*B65D 25/54* (2006.01)
*B65D 43/14* (2006.01)
*G01N 21/78* (2006.01)
*G01N 35/10* (2006.01)
*G01N 35/04* (2006.01)
*G01N 21/84* (2006.01)

(52) U.S. Cl.
CPC ............. *B65D 25/54* (2013.01); *B65D 43/14* (2013.01); *G01N 21/78* (2013.01); *G01N 35/00029* (2013.01); *G01N 35/1002* (2013.01); *G01N 21/8483* (2013.01); *G01N 35/1004* (2013.01); *G01N 2035/0498* (2013.01)

(58) Field of Classification Search
CPC . A61B 17/3215; A61B 17/3217; A61B 50/30; A61B 50/3001; A61B 5/15003; A61B 5/15305; B65F 1/1646; Y10S 220/908; Y10S 241/606
See application file for complete search history.

(56) References Cited

U.S. PATENT DOCUMENTS

2011/0024451 A1* 2/2011 West ............... B65D 35/14
            222/95
2014/0374416 A1* 12/2014 Tom ............... B29C 49/24
            220/62.21

* cited by examiner

DISPOSAL CONTAINER FOR TESTING APPARATUS AND TESTING APPARATUS

CROSS REFERENCE TO RELATED APPLICATIONS

This application claims priority under 35 U.S.C. § 119 from prior Japanese Patent Application No. 2015-234276 filed on Nov. 30, 2015, entitled "DISPOSAL CONTAINER FOR TESTING APPARATUS AND TESTING APPARATUS", the entire contents of which are hereby incorporated herein by reference.

FIELD OF THE INVENTION

The disclosure relates to a disposal container for a testing apparatus, and a testing apparatus.

BACKGROUND

Patent Literature 1 discloses an automated urine analyzer which performs a urine test using a test strip. The automated urine analyzer is equipped with a bag or a container to collect test strips which are used for the urine test.

Patent Literature 1: Japanese Patent Application Publication No. 2001-153874

SUMMARY

One or more embodiments of a disposal container for a testing apparatus may comprise a disposal container body comprising: a first opening portion that faces upward to receive a used test piece dropped by a test piece transfer part of the testing apparatus, wherein the test piece transfer part is configured to transfer the used test piece to the first opening portion; and a second opening portion that faces laterally to receive a liquid waste and to which an end of a discharge pipe of the testing apparatus is inserted, wherein the discharge pipe is configured to transfer the liquid waste to the second opening portion.

One or more embodiments of a testing apparatus may comprise a detection part which detects a color of a test piece onto which a living body specimen is dispensed; an installation part in which a disposal container is installed in a detachable manner; a test piece transfer part configured to transfer the test piece, the color of which is already detected, and drop the test piece into the disposal container installed to the installation part; and a discharge pipe configured to transfer liquid waste and discharge the liquid waste into the disposal container installed to the installation part, wherein the disposal container includes a disposal container body comprising: a first opening portion that faces upward to receive the test piece dropped by the test piece transfer part; and a second opening portion that faces laterally and to which an end of the discharge pipe is inserted.

One or more embodiments of a method of disposal of waste from testing apparatus may comprise transferring a used test piece into a disposal container through a first opening portion of the disposal container and liquid waste into the installed disposal container through a second opening of the disposal container; and removing, from the testing apparatus, the disposal container containing the used test piece and the liquid waste.

EMBODIMENTS

Hereinbelow, embodiments are described with the drawings.

The configuration of disposal container 10 for a test apparatus of an embodiment is described with reference to FIG. 1 to FIG. 8.

(Overview of Disposal Container for Testing Apparatus)

Figure 1:
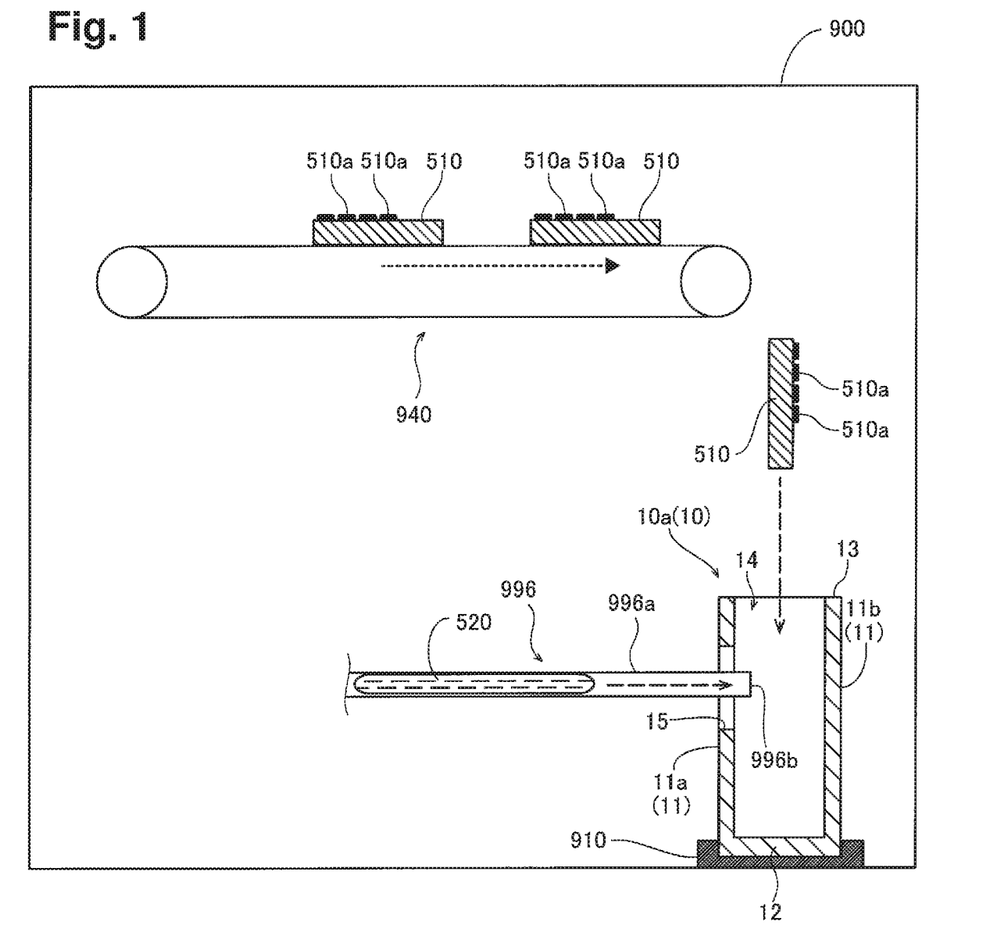
FIG. 1 is a conceptual diagram that illustrates a disposal container for a testing apparatus according to an embodiment.

FIG. 1 illustrates disposal container 10. Disposal container 10 is used by being installed to installation part 910 of testing apparatus 900. Testing apparatus 900 includes test piece transfer part 940 to transfer test pieces 510 used in the testing apparatus and to drop the test pieces into disposal container 10. Testing apparatus 900 includes discharge pipe 996a to transfer liquid waste 520 produced due to the operation of the testing apparatus and to discharge the liquid waste into disposal container 10.

Disposal container 10 includes disposal container body 10a having lateral wall 11 and bottom wall 12 continuously provided at a lower end of lateral wall 11. Disposal container 10 is formed in the shape of a box and is disposable. Lateral wall 11 includes two or more lateral walls. The two or more lateral walls include lateral wall 11a and lateral wall 11b. Disposal container 10 is formed of paper with liquid absorbency and flexibility. To be more specific, disposal container 10 is formed of coated board with white front surface and white back surface. The coated board is made from wood pulp, recycled fiber, or the like. Disposal container 10 may be made of synthetic paper which is made mainly from synthetic fiber.

Opening portion 14 opened upward is provided in an upper end portion 13 of disposal container 10. Opening portion 14 is provided in order to receive, from above to the inside, test pieces 510 which is transferred and dropped by test piece transfer part 940 of testing apparatus 900 after being used in testing apparatus 900. Test piece 510 is an object onto which a living body specimen is dripped for a test. Test piece 510 is a test strip. Test piece 510 includes reaction part 510a to react with the dripped living body specimen. In order to be applied to a test with two or more test items, test piece 510 may include two or more reaction parts 510a corresponding to the respective test items. After being used for a test, test pieces 510 are dropped, through opening portion 14, from above disposal container 10, and then are stored inside disposal container 10.

Opening portion 15 is provided on lateral wall 11a of disposal container 10. Opening portion 15 is opened laterally. Disposal container 10 is arranged such that opening portion 15 faces toward the center side of testing apparatus 900. Opening portion 15 is formed at a height position lower than opening portion 14. Opening portion 15 is provided in order to receive liquid waste 520 laterally to the inside of disposal container 10. Liquid waste 520 is produced due to the operation of testing apparatus 900 and is transferred by discharge pipe 996a. End 996b of discharge pipe 996a of testing apparatus 900 is configured to be inserted into opening portion 15. Liquid waste 520 is transferred through opening portion 15 laterally into disposal container 10, and then is stored inside disposal container 10.

The above configuration makes it possible to collect test pieces 510 and liquid waste 520 together in one place and then to easily dispose of the collected test pieces and liquid waste, even if test pieces 510 are used and liquid waste 520 is produced due to the operation of testing apparatus 900. In other words, it is possible to collect used test pieces 510 and liquid waste 520 together in one place and then to easily dispose of the collected test pieces and liquid waste.

Moreover, the above configuration makes it possible to separately collect test pieces 510 and liquid waste 520 through opening portion 14 and opening portion 15, respectively. Thus, test pieces 510 and liquid waste 520 are smoothly collected without obstructing each other when being stored into the inside of disposal container 10. In addition, disposal container 10 is disposable. Hence, biohazards can be suppressed with ease.

(Detailed Configuration of Disposal Container for Testing Apparatus)

Hereinbelow, a configuration of a preferred embodiment of disposal container 10 illustrated in FIG. 1 is described in detail with reference to FIG. 2 and the following drawings.

Figure 2:
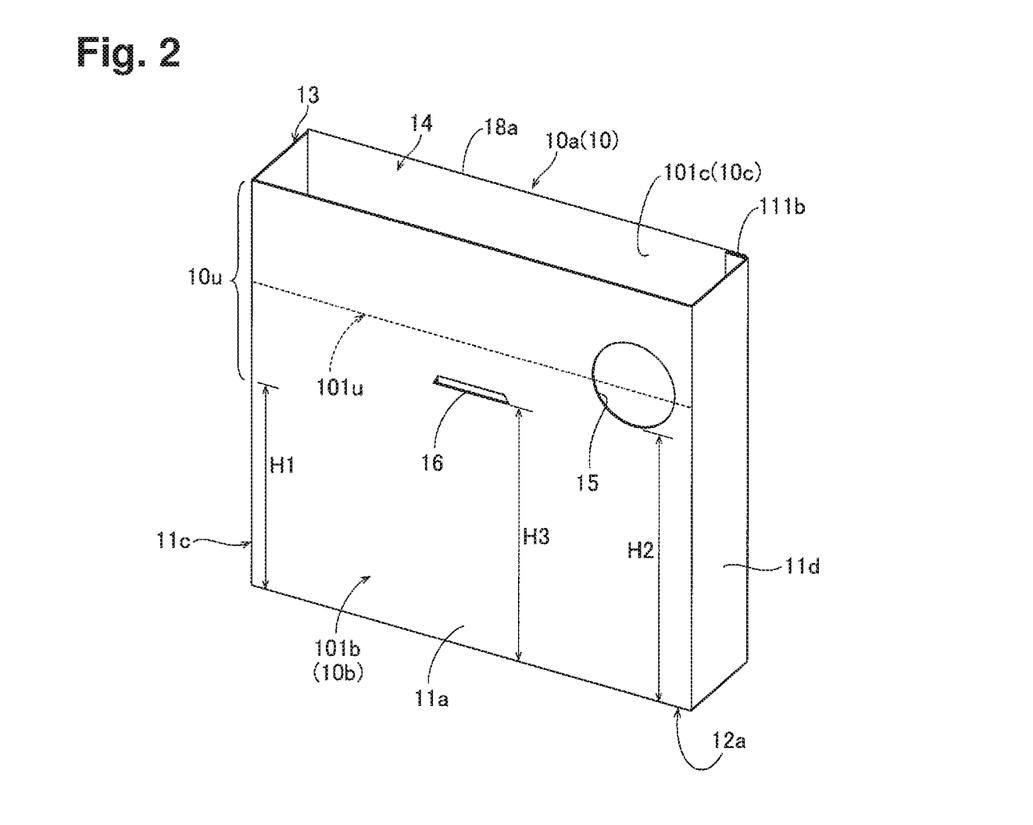
FIG. 2 is a perspective view of the disposal container.

As illustrated in FIG. 2, disposal container body 10a of disposal container 10 is formed substantially in the shape of a rectangular parallelepiped opened upward. In a plan view, disposal container body 10a has the shape of a rectangle formed from opposed longer sides and opposed shorter sides. Disposal container body 10a includes four lateral walls. The four lateral walls are lateral wall 11a to lateral wall 11d. Lateral wall 11a and lateral wall 11b are the longer-side lateral walls, have the same outline shape, and are opposed to each other. Lateral wall 11c and lateral wall 11d are the shorter-side lateral walls, have the same outline shape and area, and are opposed to each other. Lateral wall 11a is orthogonal to lateral wall 11c and lateral wall 11d. Lateral wall 11b is orthogonal to lateral wall 11c and lateral wall 11d. Disposal container 10 includes disposal container body 10a, resin sheet 101b which covers outer surface 10b of disposal container body 10a, and resin sheet 101c which covers inner surface 10c of disposal container body 10a. Note that outer surface 10b of disposal container body 10a may not be covered with resin sheet 101b. Inner surface 10c of disposal container body 10a may not be covered with resin sheet 101c.

Opening portion 14 is formed in such a shape that entire upper end portion 13 of disposal container body 10a is opened. Opening portion 14 has the shape of a rectangle in a plan view. There is provided one opening portion 14. Note that disposal container body 10a may be provided with a top wall, and opening portion 14 may be provided in a way to penetrate portion of the top wall. Opening portion 14 may have a shape other than that of a rectangle in a plan view. There may be provided two or more opening portions 14.

Opening portion 15 is formed at a position higher than the height position of the center of disposal container body 10a. To be more specific, opening portion 15 is formed in a region in the vicinity of an upper end of lateral wall 11a and the vicinity of either one of the lateral ends thereof. In more detail, opening portion 15 is formed in a region in the upper right of lateral wall 11a when lateral wall 11a is viewed from the front. Height H2 of a lower end portion of opening portion 15 is higher than height H1 of the center of disposal container body 10a. Opening portion 15 is formed within a region higher than the height position of the center of disposal container body 10a. Opening portion 15 is formed at a position of upper portion 10u higher than the height position of the center of disposal container body 10a, and at center position 101u or in the vicinity of center position 101u of upper portion 10u in a height direction of disposal container body 10a. This makes it possible to store liquid waste 520 to a level higher than the height position of the center of disposal container body 10a when liquid waste 520 is to be stored into the disposal container body 10a. As a result, the amount of liquid waste 520 stored can be made large. In addition, liquid waste 520 is allowed to be stored into the inside of disposal container body 10a through opening portion 15 formed at lateral wall 11a. Thereby, the height of entire disposal container body 10a can be made large, compared to the case where the height of disposal container body 10a is made small such that end 996b of discharge pipe 996a is positioned in an upper part of opening portion 14 of disposal container body 10a, and liquid waste 520 from discharge pipe 996a is stored into the inside of disposal container body 10a through opening portion 14. Thus, it is possible to store more test pieces 510 inside disposal container body 10a. Incidentally, opening portion 15 may be formed at a height position equal to or lower than the height position of the center of disposal container body 10a.

Opening portion 15 is provided on the lateral wall 11d side of lateral wall 11a. Opening portion 15 is formed in the shape of a circle. There is provided one opening portion 15. Opening portion 15 may have a shape other than that of a circle. Although opening portion 15 is an independent opening portion which is not connected to opening portion 14 located above, opening portion 15 may be formed of a notch connected from opening portion 14. There may be provided two or more opening portions 15. An edge portion of opening portion 15 is formed by lateral wall 11a. A periphery of opening portion 15 is surrounded by lateral wall 11a. This makes it possible to increase the strength of lateral wall 11a and to suppress deformation of the shape of disposal container body 10a even in the case where liquid waste 520 is stored into disposal container body 10a.

Lateral wall 11a is provided with engagement portion 16. Engagement portion 16 is formed at a position higher than the height position of the center of disposal container body 10a. To be more specific, height H3 of a lower end portion of engagement portion 16 is higher than height H1 of the center of disposal container body 10a. Height H3 of the lower end portion of engagement portion 16 is lower than height H2 of the lower end portion of opening portion 15. Engagement portion 16 is provided substantially at the center of lateral wall 11a in a horizontal width direction when viewed from a direction orthogonal to lateral wall 11a. Engagement portion 16 is formed as a hole. Engagement portion 16 is formed in an oblong shape which extends in a direction parallel to bottom edge 12a on lateral wall 11a when viewed from the direction orthogonal to lateral wall 11a. Incidentally, the height of the lower end portion of engagement portion 16 may be substantially equal to that of the lower end portion of opening portion 15.

Figure 3:
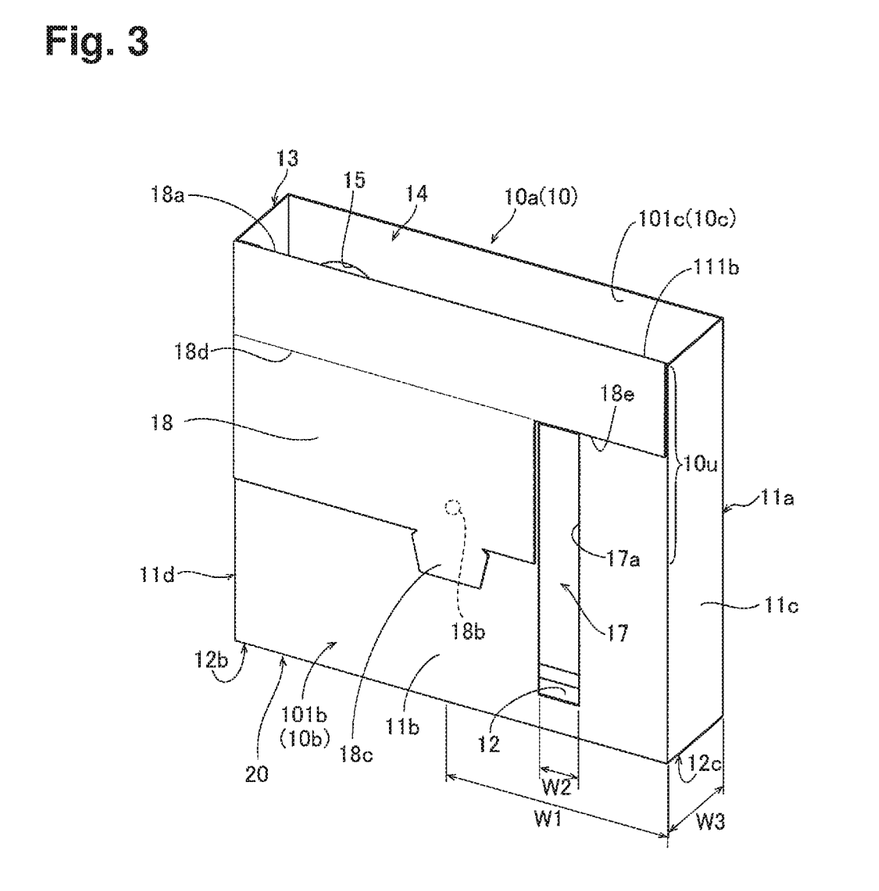
FIG. 3 is a perspective view of the disposal container viewed from the lateral wall side with a window portion.

As illustrated in FIG. 3, transparent window portion 17 is provided in disposal container 10. Window portion 17 is formed by covering opening 17a provided on lateral wall 11b with transparent resin sheet 101b. This makes it possible to check the stored matter inside disposal container body 10a through window portion 17 even in the case where disposal container body 10a is visually checked from the outside. Incidentally, window portion 17 may be formed of a material other than resin. Window portion 17 may be semi-transparent.

Window portion 17 is provided in lateral wall 11b opposed to lateral wall 11a. This makes it possible to arrange disposal container 10 in testing apparatus 900 such that opening portion 15 to receive liquid waste 520 into the inside of disposal container 10 faces toward the center side of testing apparatus 900, and window portion 17 faces toward the outside of testing apparatus 900. As a result, it is possible to visually check the inside of disposal container 10 through window portion 17 while storing with ease liquid waste 520 produced due to the operation of the apparatus into the inside of disposal container 10.

Window portion 17 has the shape of a rectangle extending in an up-and-down direction. Window portion 17 is formed in a way to extend in the up-and-down direction from a lower portion toward an upper portion of disposal container body 10a. Window portion 17 is formed in a way to extend toward an up-direction from the vicinity of lower end portion 20 of disposal container body 10a to the position of upper portion 10u higher than the height position of the center of disposal container body 10a. Window portion 17 extends from a region lower than the height position of the center of disposal container body 10a to a region higher than the height position of the center of disposal container body 10a. In more detail, window portion 17 is configured in a way to extend to a position higher than a lower end position of opening portion 15. This makes it possible to recognize with ease the change in stored amount even in the case where the stored matter inside disposal container body 10a increases. Incidentally, window portion 17 may be located in a region lower than the height position of the center of disposal container body 10a. Window portion 17 may be located in a region higher than the height position of the center of disposal container body 10a.

Window portion 17 is formed such that its width W2 is smaller than half width W1 of lateral wall 11b in a width direction of lateral wall 11b. Window portion 17 is formed such that its width W2 is smaller than half width W1 of lateral wall 11b in a direction parallel to bottom edge 12b on lateral wall 11b. Window portion 17 is formed such that its width W2 is smaller than width W3 of lateral wall 11c in a direction parallel to bottom edge 12c on lateral wall 11c.

Figure 4:
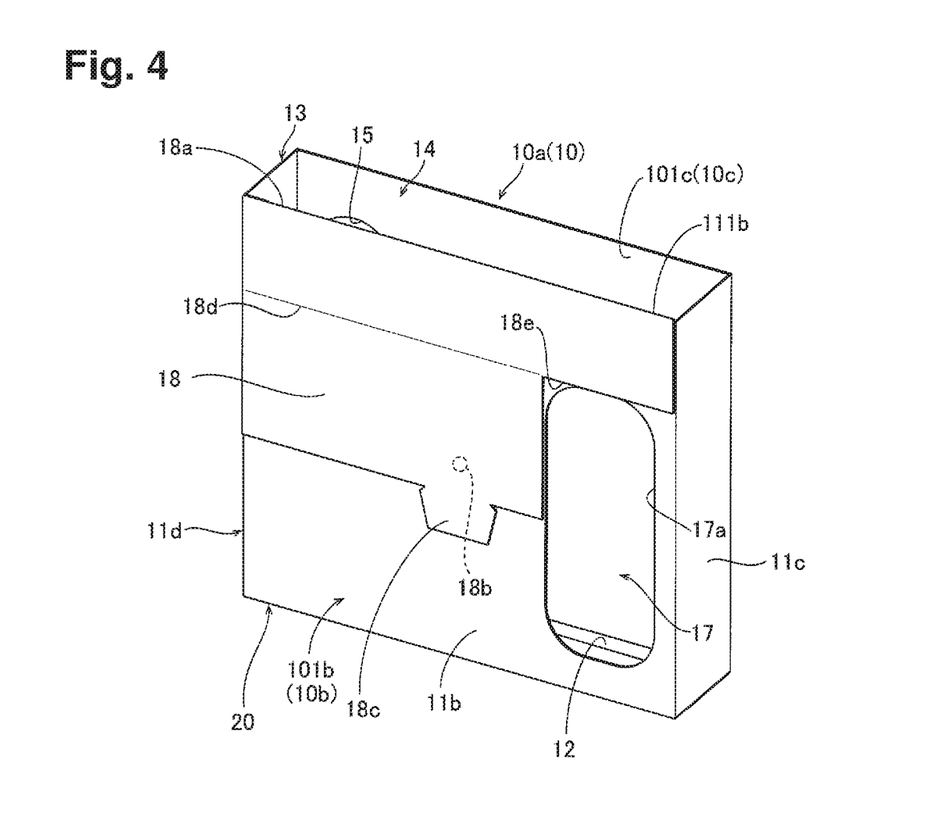
FIG. 4 is a diagram illustrating another configuration example of the window portion.
Figure 5:
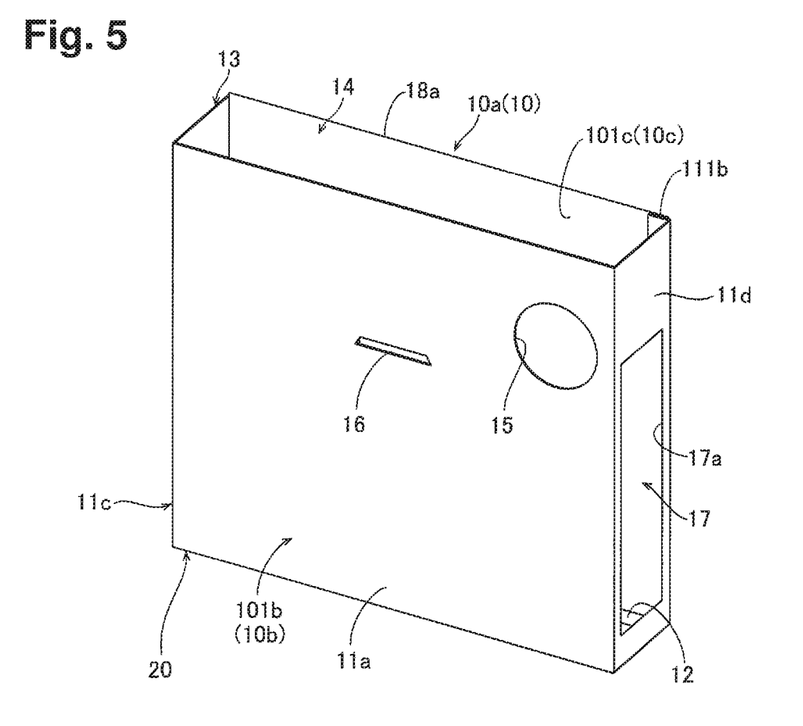
FIG. 5 is a diagram illustrating still another configuration example of the window portion.

Various configurations can be employed for window portion 17. As illustrated in FIG. 4, window portion 17 may be formed in a shape other than that of a rectangle, for example, an ellipse. As another configuration, window portion 17 may have a width larger than half width W1 of lateral wall 11b in the direction parallel to bottom edge 12b on lateral wall 11b when viewed from a direction orthogonal to lateral wall 11b. In addition, as illustrated in FIG. 5, window portion 17 may be provided except in lateral wall 11b, for example, in lateral wall 11d orthogonal to lateral wall 11a. Window portion 17 may be provided in lateral wall 11c orthogonal to lateral wall 11a.

Outer surface 10b of disposal container body 10a is covered with waterproof resin sheet 101b. This makes it possible to suppress leakage of liquid to the outside of disposal container 10 even in the case where the liquid is stored into the inside of disposal container 10.

As illustrated in FIG. 3, resin sheet 101b covers entire outer surface 10b. The material for resin sheet 101b is polypropylene (PP). Resin sheet 101b may cover part of outer surface 10b. The material for resin sheet 101b may be that other than polypropylene.

Opening 17a is provided in lateral wall 11b opposed to lateral wall 11a. Outer surface 10b of disposal container body 10a and opening 17a together are covered with resin sheet 101b. Thereby, window portion 17 is formed. Resin sheet 101b is transparent. This makes it possible to form window portion 17 with ease compared to the case where window portion 17 is formed by covering opening 17a with resin sheet 101b separately from outer surface 10b of disposal container body 10a. Incidentally, resin sheet 101b may be semi-transparent.

Inner surface 10c of disposal container body 10a is covered with waterproof resin sheet 101c. Resin sheet 101c covers entire inner surface 10c. The material for resin sheet 101c is polypropylene, as with the material for resin sheet 101b. Resin sheet 101c may cover part of inner surface 10c. The material for resin sheet 101c may be that other than polypropylene. Resin sheet 101c and resin sheet 101b may be made of materials different from each other.

Figure 6:
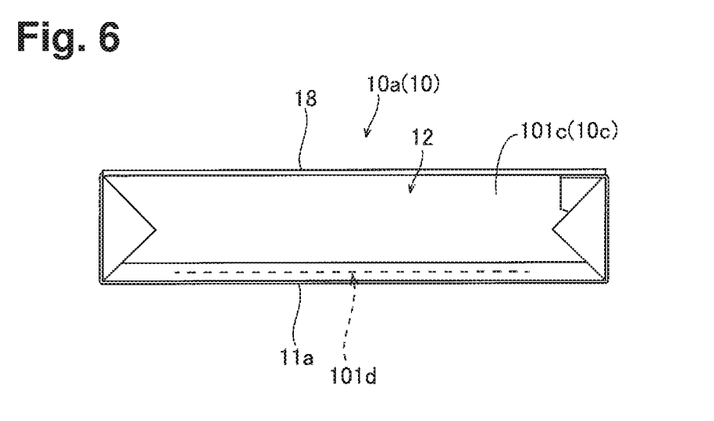
FIG. 6 is a diagram illustrating holes formed with a resin sheet of the disposal container.

Disposal container body 10a is formed of paper with liquid absorbency. As illustrated in FIG. 6, holes 101d to expose an upper surface (inner bottom surface) of bottom wall 12 of disposal container body 10a are formed with resin sheet 101c covering inner surface 10c. In a plan view, multiple holes 101d are provided to be arranged in a line. Thus, the liquid stored into the inside of disposal container 10 is absorbed into disposal container body 10a formed of paper through holes 101d. As a result, stains of the liquid absorbed into disposal container body 10a make it possible to recognize that disposal container 10 is already used. Thus, it is possible to suppress repeated use of disposal container 10 already used, and to suppress biohazards.

In addition, there may be provided one hole 101d. Holes 101d may be formed substantially in the shape of a curve. Holes 101d may be formed with resin sheet 101c at a position corresponding to lateral wall 11.

As illustrated in FIG. 3, disposal container body 10a is provided with cover portion 18. Cover portion 18 is provided in order to cover opening portion 14 and opening portion 15 when disposal container 10 is to be disposed of. Cover portion 18 includes a portion that is configured to cover opening portion 14 and a portion that is configured to cover opening portion 15. This makes it possible to suppress spillage of the stored matter from the inside to the outside of disposal container 10 when disposal container 10 is to be disposed of. Incidentally, disposal container body 10a may not be provided with cover portion 18.

Window portion 17 and opening portion 15 are formed in positions not overlapping each other when viewed from the direction orthogonal to lateral wall 11a. To be more specific, window portion 17 and opening portion 15 are arranged to be lined in a right-left direction when viewed from the direction orthogonal to lateral wall 11a. Window portion 17 and opening portion 15 are arranged on opposite sides from each other with respect to a straight line orthogonal to lateral wall 11a at the center position of lateral wall 11a. Also, in a plan view, window portion 17 and opening portion 15 are arranged at positions diagonal to each other. This makes it possible to prevent window portion 17 to be covered with cover portion 18 even in the case where cover portion 18 is provided, which is capable of closing opening portion 15 by being folded back from the lateral wall 11*b* side to the lateral wall 11*a* side, and in the state where cover portion 18 is arranged on the lateral wall 11*b* side and opening portion 15 is not closed.

Cover portion 18 is formed integrally with disposal container body 10*a*. This makes it possible to close opening portion 14 and opening portion 15 with ease when disposal container 10 is to be disposed of, unlike the case where cover portion 18 is provided separately from disposal container body 10*a*. As a result, disposal container 10 can be handled with ease at the time of disposal. Incidentally, cover portion 18 may be provided separately from disposal container body 10*a*.

Cover portion 18 is provided with a joint portion 18*a*. Cover portion 18 is joined to upper end 111*b* of lateral wall 11*b* opposed to lateral wall 11*a* via joint portion 18*a*. This makes it possible to join cover portion 18 to disposal container body 10*a* with ease via joint portion 18*a*.

Cover portion 18 is provided with adhesion portion 18*b*. Cover portion 18 is bonded to lateral wall 11*b* using adhesion portion 18*b* in a detachable state. Adhesion portion 18*b* is an adhesive. This makes it possible to arrange with ease disposal container 10 in testing apparatus 900, with cover portion 18 fixed to lateral wall 11*b* in the state before disposal where opening portion 14 and opening portion 15 do not have to be closed. Cover portion 18 may be attached using an adhesive tape, for example. Cover portion 18 may not be bonded to lateral wall 11*b* in a detachable state.

Note that when opening portion 14 and opening portion 15 are to be closed, joint portion 18*a* and bendable portion 18*d* are bent. Thereby, cover portion 18 covers opening portion 14 and opening portion 15.

Cover portion 18 includes cutout portion 18*e*. A part of cover portion 18 is cut out by cutout portion 18*e* along window portion 17 in the shape of a rectangle. Cover portion 18 is arranged on lateral wall 11*b* in the state where window portion 17 is exposed by cutout portion 18*e*. Cover portion 18 exposes window portion 17 through cutout portion 18*e* in the state where opening portion 14 and opening portion 15 are not closed. Cover portion 18 is bonded to lateral wall 11*b* by adhesion portion 18*b* in the state where window portion 17 is not covered. Thus, in the state before disposal where opening portion 14 and opening portion 15 are not closed, it is possible to arrange with ease disposal container 10 in testing apparatus 900, and to check the stored matter inside disposal container 10 even in the case where disposal container 10 is visually checked from the outside. In the configuration example of FIG. 3, window portion 17 is exposed even in a closed state. Window portion 17 may be covered in the closed state.

Figure 7:
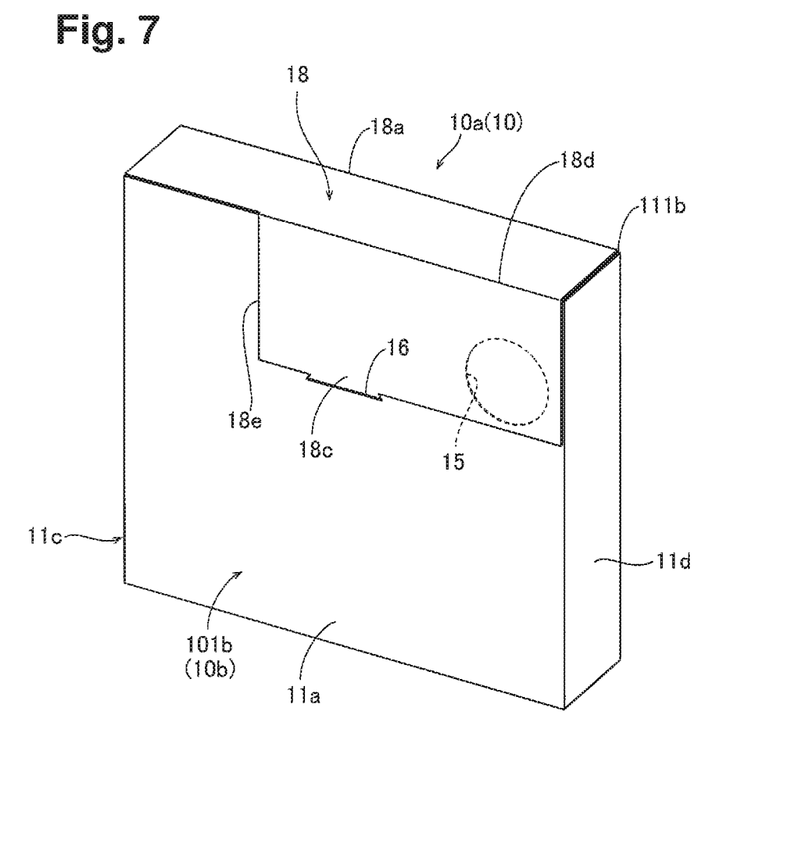
FIG. 7 is a perspective view illustrating the disposal container in a state where a cover portion is closed.

Cover portion 18 is provided with engagement portion 18*c*. Engagement portion 18*c* is provided in order to engage with engagement portion 16 of lateral wall 11*a* at the time of disposal. Engagement portion 18*c* is formed in a shape which allows engagement with slit-shaped engagement portion 16. As illustrated in FIG. 7, cover portion 18 is bent from the lateral wall 11*b* side to the lateral wall 11*a* side. Thereby, opening portion 14 and opening portion 15 are closed. At this moment, engagement portion 18*c* is inserted into engagement portion 16. Engagement of engagement portion 16 with engagement portion 18*c* maintains a state where opening portion 14 and opening portion 15 are closed by cover portion 18. Note that in FIG. 7, opening portion 15 is illustrated using a dashed line for the sake of the convenience of explanation. Incidentally, cover portion 18 may not be provided with engagement portion 18*c*.

Figure 8:
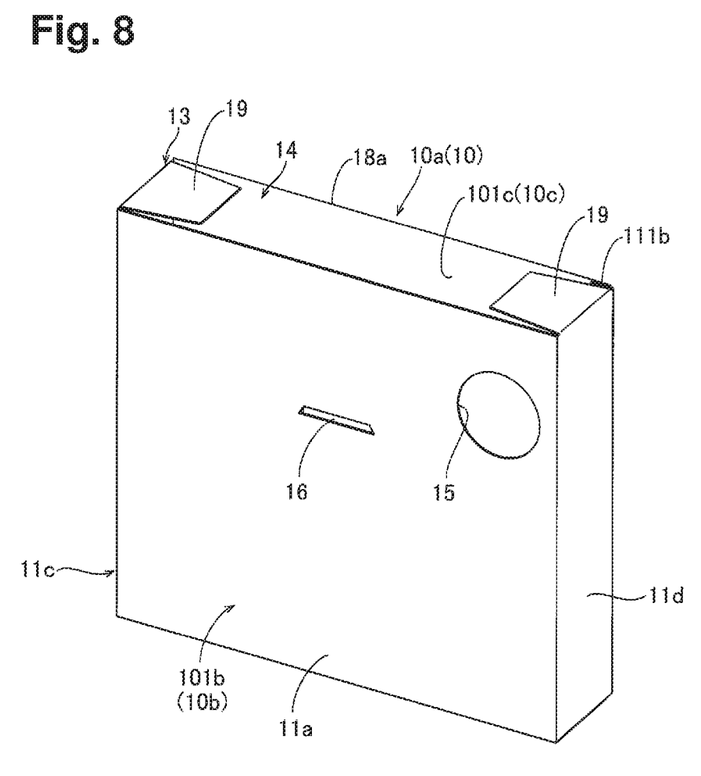
FIG. 8 is a diagram illustrating the disposal container provided with flaps.

Meanwhile, another configuration may be employed as the configuration of disposal container 10. As illustrated in FIG. 8, for example, flake-shaped flaps 19 may be provided on upper end portion 13 of disposal container body 10*a*. One pair of flaps 19 can be provided, for example. Flaps 19 are formed within the outline of disposal container 10 in a plan view. Flaps 19 are bent to the inner side of disposal container 10. Flaps 19 can suppress spillage of the stored matter from the gaps between upper end portion 13 and cover portion 18 to the outside when disposal container 10 is to be disposed of.

(Configuration of Testing Apparatus)

Subsequently, testing apparatus 900 to which disposal container 10 is installed is described with reference to FIG. 9 to FIG. 11.

Figure 9:
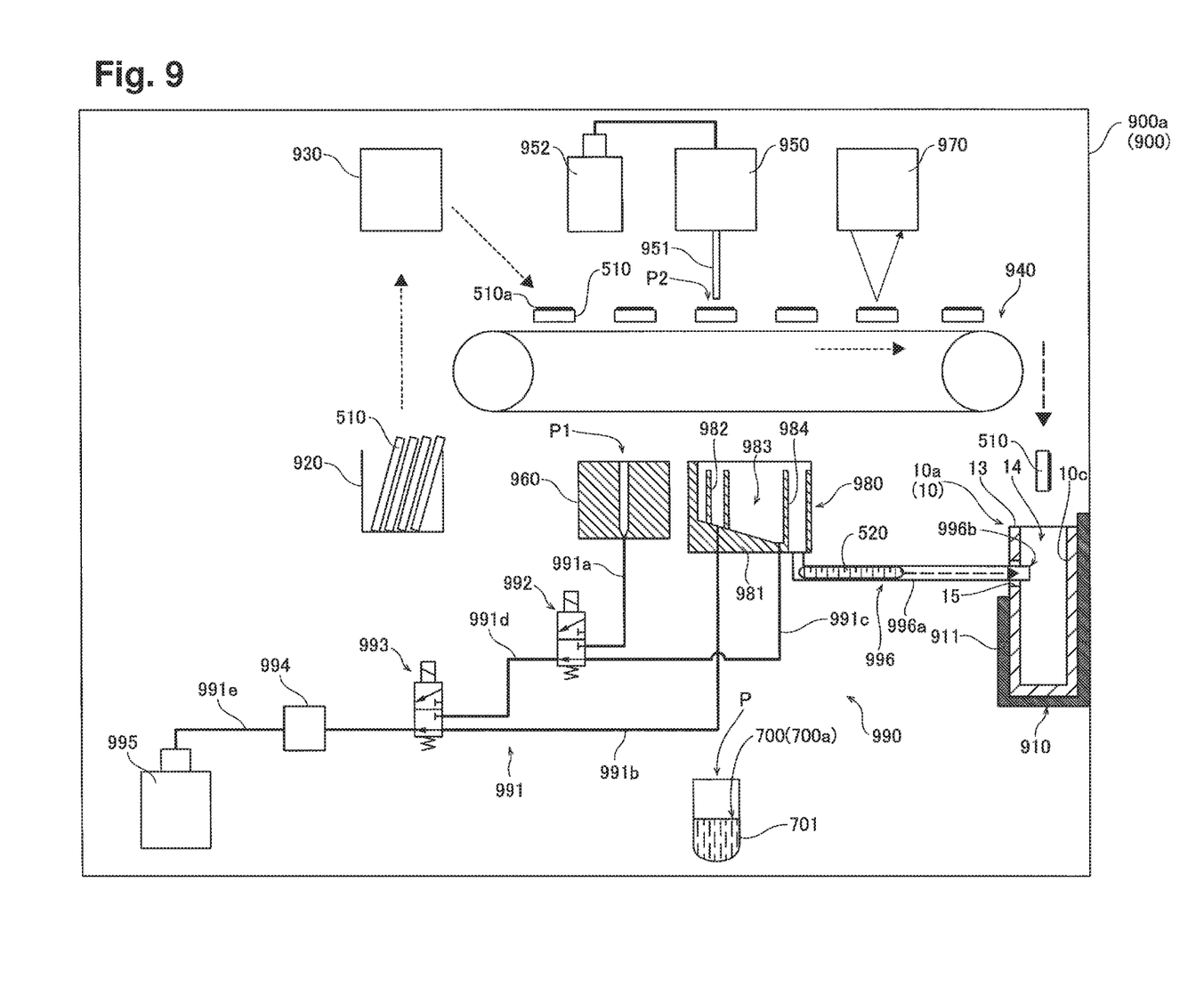
FIG. 9 is a schematic diagram illustrating the inside of a testing apparatus according to an embodiment.

As illustrated in FIG. 9, testing apparatus 900 includes installation part 910, test piece retention unit 920, test piece extraction unit 930, test piece transfer part 940, dispensing part 950, measurement unit 960, detection part 970, cleaning part 980, and fluid circuit section 990. Fluid circuit section 990 is provided with transfer unit 996 comprising discharge pipe 996*a*. Discharge pipe 996*a* transfers and discharges liquid waste 520. FIG. 9 illustrates disposal container 10 in a simplified manner.

Testing apparatus 900 is an apparatus to test living body specimen 700. Living body specimen 700 is urine 700*a*, and testing apparatus 900 is urine qualitative analyzer 900*a* which performs urine qualitative analysis by detecting the color of test piece 510 onto which urine 700*a* is dripped, using detection part 970. Note that living body specimen 700 may be other than urine 700*a*, and testing apparatus 900 may be an apparatus which tests living body specimen 700 other than urine 700*a*.

(Detailed Description of Installation Part)

Figure 10:
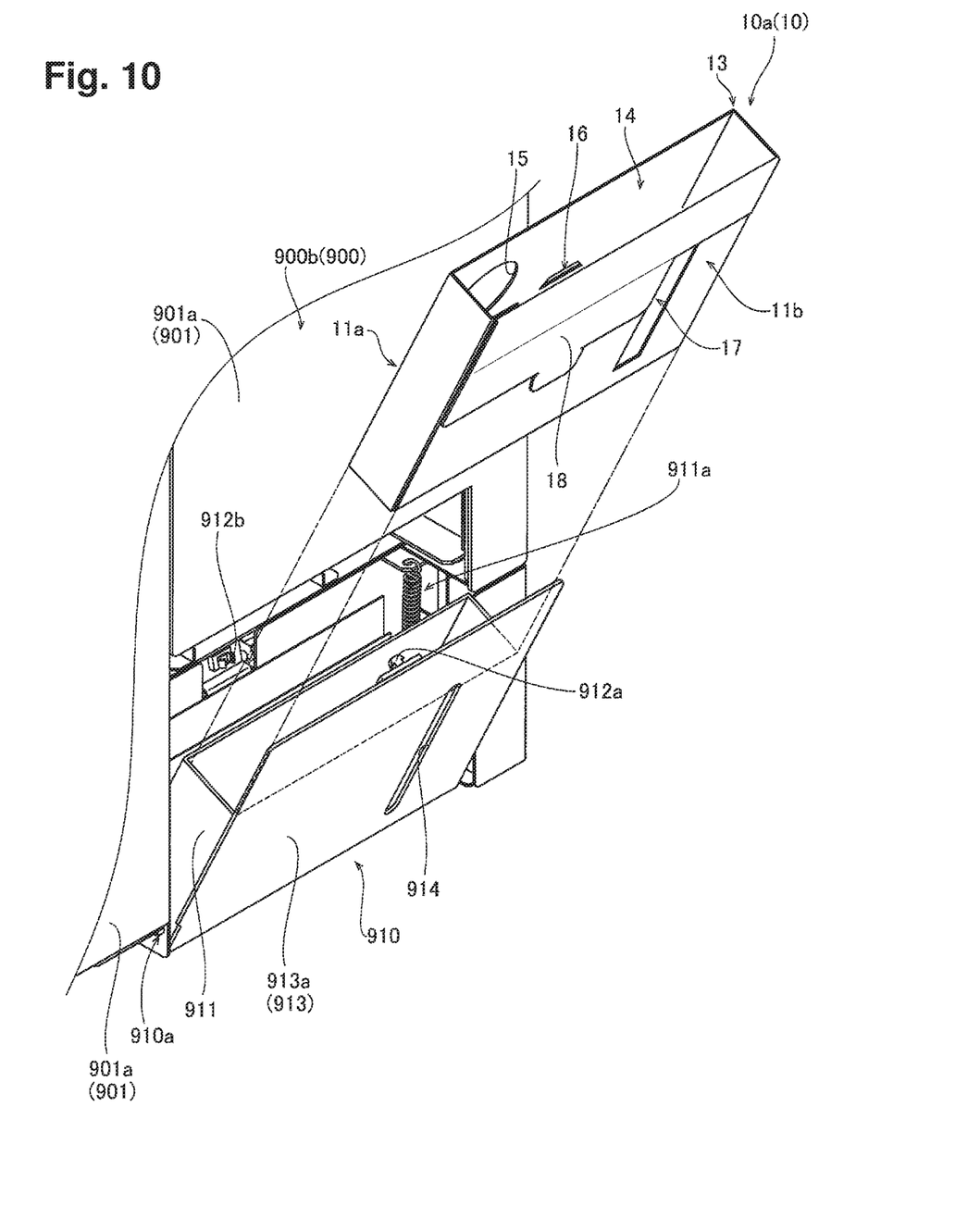
FIG. 10 is a diagram illustrating a state where the disposal container is installed to an installation part of the testing apparatus.

As illustrated in FIG. 10, installation part 910 installs disposal container 10 in a detachable manner. Installation part 910 includes holder portion 911, on the inner surface side, which is capable of retaining disposal container 10. Holder portion 911 is a container with an opening opened in its upper side. Installation part 910 is installed to testing apparatus body 900*b* on pivot shaft 910*a*. Installation part 910 can be opened and closed to testing apparatus body 900*b* with pivot shaft 910*a* as the pivot center.

Installation part 910 in an open state can install disposal container 10 to holder portion 911. An outer frame portion of bottom portion of holder portion 911 is connected to one end of open state retention member 911*a*. Another end of open state retention member 911*a* is connected to the body of testing apparatus 900. Open state retention member 911*a* is formed from a spring. Open state retention member 911*a* applies a biasing force toward the outside of testing apparatus 900 to installation part 910 by acting a biasing force pulling bottom portion of holder portion 911 upward on holder portion 911. This ensures that the open state of installation part 910 is maintained. Open state retention member 911*a* may be other than a spring as long as it can apply a biasing force.

Installation part 910 is provided with engagement portion 912*a* on the inner surface side. Engagement portion 912*b* is provided at a position of testing apparatus 900 corresponding to engagement portion 912*a* of installation part 910 in the close state. Installation part 910 is pushed to the inner side of testing apparatus 900, and engagement portions 912*a* and 912*b* are engaged. Thereby, the close state of installation part 910 is maintained. Installation part 910 with disposal container 10 installed to holder portion 911 is brought to the close state. In the state, it is possible to collect test pieces 510 and liquid waste 520 produced due to the operation of testing apparatus 900 using disposal container 10. Incidentally, installation part 910 may not be provided with engagement portion 912a. Testing apparatus 900 may not be provided with engagement portion 912b.

Opening portion 914 is formed in outer surface 913 of installation part 910. Opening portion 914 is formed at a position corresponding to window portion 17 provided in disposal container 10, in the state where disposal container 10 is installed to installation part 910. This makes it possible to check the stored matter inside disposal container body 10a even in the case where testing apparatus 900 is visually checked from the outside.

Opening portion 914 exposes window portion 17 provided in disposal container 10, in the state where disposal container 10 is installed to installation part 910. Opening portion 914 may have a shape different form that of window portion 17 illustrated in FIG. 10, as long as it has a shape which exposes at least part of window portion 17 in disposal container 10.

Outer surface 913 of installation part 910 includes flat portion 913a. Apparatus outer surface 901 on the side on which installation part 910 of testing apparatus 900 is provided includes flat portion 901a. In the state where installation part 910, in which disposal container 10 is stored, is closed with respect to testing apparatus body 900b, outer surface 913 of installation part 910 and apparatus outer surface 901 have no difference in level and are arranged in the same plane. Thus, even in the case where installation part 910, in which disposal container 10 is stored, is closed, it is possible to suppress the increase in the size of testing apparatus 900 because installation part 910 does not bulge to the outside of testing apparatus 900.

Figure 11:
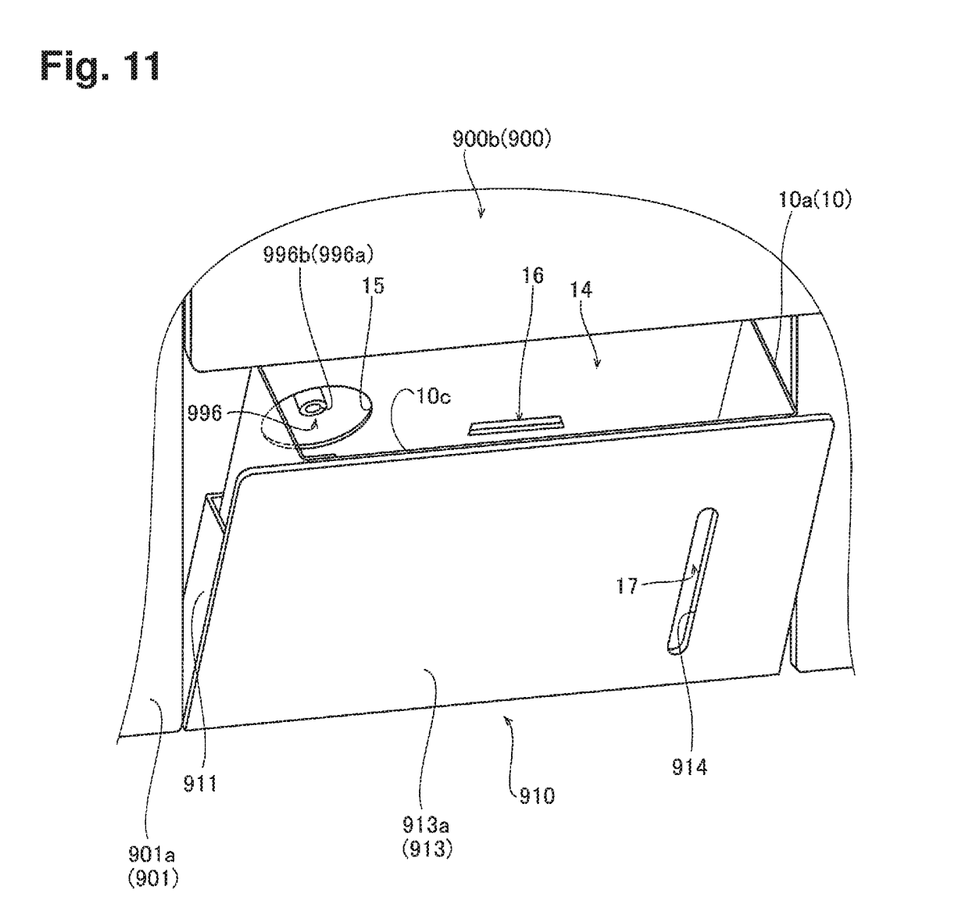
FIG. 11 is a diagram illustrating the installation part transitioning to the close state.

When installation part 910, in which disposal container 10 is stored, is to be closed, end 996b of discharge pipe 996a is arranged inside disposal container 10 in a space formed by opening portion 15 of disposal container 10 in a way not to come into contact with disposal container 10, as illustrated in FIG. 11.

(Detailed Description Except Installation Part)

As illustrated in FIG. 9, test piece retention unit 920 retains test pieces 510 onto which living body specimen 700 has yet to be dripped.

Test piece extraction unit 930 extracts test pieces 510 before use from test piece retention unit 920. Test piece extraction unit 930 extracts test pieces 510 from test piece retention unit 920 using suction. Test piece extraction unit 930 arranges test pieces 510 attest piece transfer part 940 such that reaction part 510a to react with dripped living body specimen 700 is provided on the upper surface of test pieces 510. In other words, reaction part 510a faces upward. In synchronization with the timing at which living body specimen 700 is dripped by dispensing part 950, test piece extraction unit 930 extracts test pieces 510 from test piece retention unit 920 and arranges the test pieces at test piece transfer part 940. Test piece extraction unit 930 may be provided with a grip portion to extract test pieces 510 from test piece retention unit 920.

Test piece transfer part 940 transfers in sequence test pieces 510 extracted from test piece retention unit 920 by test piece extraction unit 930 to drip position P2 below dispensing part 950 and to a position below detection part 970. Test piece transfer part 940 transfers test pieces 510, the colors of which are already detected by detection part 970, toward opening portion 14 of disposal container 10 installed to installation part 910. Test piece transfer part 940 is formed from a transportation mechanism such as a conveyor belt.

An end portion of test piece transfer part 940 on the downstream side in a transfer direction is located above disposal container 10 installed to installation part 910 in the close state. This makes it possible to drop and collect with ease test pieces 510 transferred by test piece transfer part 940 into disposal container 10. Used test pieces 510 are induced in a periodic manner due to the operation of testing apparatus 900.

The end portion of test piece transfer part 940 on the downstream side is arranged at a position higher than upper end portion 13 of disposal container 10, in the state where disposal container 10 installed to installation part 910 is stored in testing apparatus 900. This makes it possible to collect test pieces 510 inside disposal container 10 through opening portion 14 by dropping test pieces 510 from above disposal container 10.

Dispensing part 950 is provided with nozzle 951. Dispensing part 950 aspirates living body specimen 700 from container 701 transported to aspiration position P by a not-illustrated transportation device. Dispensing part 950 dispenses living body specimen 700 aspirated at aspiration position P to measurement unit 960 at dispensing position P1 using nozzle 951. Dispensing part 950 drips living body specimen 700 aspirated at aspiration position P onto test pieces 510 transferred to drip position P2 using nozzle 951. After dispensing living body specimen 700 to measurement unit 960, dispensing part 950 drips living body specimen 700 onto test pieces 510, and then performs cleaning operation of nozzle 951 at cleaning part 980.

Measurement unit 960 performs the measurement of living body specimen 700 using an optical measurement method. Measurement unit 960 performs a measurement on dispensed living body specimen 700 pertaining to at least one of the specific gravity, turbidity, and color tone of living body specimen 700. Note that measurement unit 960 may perform a measurement of an item other than the specific gravity, turbidity, and color tone of living body specimen 700. Measurement unit 960 may perform a measurement of living body specimen 700 using a method other than an optical measurement method.

Detection part 970 is provided in order to detect the color of test piece 510 onto which living body specimen 700 is dripped. Detection part 970 captures an image of test piece 510 onto which living body specimen 700 is dripped. Then, detection part 970 classifies into levels the degree of color change of reaction part 510a of test piece 510, and obtains the degree of color change as a measurement result. Note that detection part 970 may apply light onto test piece 510 and obtain the degree of color change of reaction part 510a by detecting reflected light from reaction part 510a.

Cleaning part 980 is provided in order to clean nozzle 951 of dispensing part 950. Cleaning part 980 is provided with cleaning reservoir 981. Cleaning reservoir 981 is provided with nozzle insertion section 982, liquid receiving section 983, and overflow liquid collection section 984.

Nozzle insertion section 982 is a container extending in the up-and-down direction. Nozzle insertion section 982 is opened upward. Nozzle insertion section 982 is formed in the shape of a cylinder. Nozzle 951 is inserted into nozzle insertion section 982 when nozzle 951 of dispensing part 950 is to be cleaned. In this state, dispensing part 950 supplies cleaning liquid, which is stored in cleaning liquid storing container 952, to the inside of nozzle 951. Then, the cleaning liquid is discharged from the tip end. Thus, the inner surface of nozzle 951 can be cleaned. The cleaning liquid discharged from nozzle 951 is accumulated in nozzle insertion section 982. Thus, the outer surface of nozzle 951 can be cleaned. Note that nozzle insertion section 982 may have a configuration where the cleaning liquid is discharged to nozzle 951 inserted into nozzle insertion section 982.

Pipe 991b serving as a flow path is connected to a lower end portion of nozzle insertion section 982. The cleaning liquid inside nozzle insertion section 982 is discharged from the lower end portion of nozzle insertion section 982 such that out of the cleaning liquid discharged from the tip end of nozzle 951, part of the cleaning liquid overflows from nozzle insertion section 982.

Liquid receiving section 983 is formed on a periphery of nozzle insertion section 982. Liquid receiving section 983 includes a bottom wall at a position lower than an upper end of nozzle insertion section 982. Liquid receiving section 983 receives part of the cleaning liquid discharged from the tip end of nozzle 951 and overflowed from nozzle insertion section 982.

Overflow liquid collection section 984 extends in the up-and-down direction. Overflow liquid collection section 984 is a flow path to allow a fluid to pass through. An upper end of overflow liquid collection section 984 is located at a position lower than an upper end of cleaning reservoir 981.

Fluid circuit section 990 includes pipe 991, valves 992 and 993, pump 994, liquid waste storing unit 995, and transfer unit 996. Pipe 991 includes pipes 991a to 991e.

One end of pipe 991a is connected to measurement unit 960. Another end of pipe 991a is connected to valve 992. Living body specimen 700, the measurement of which is finished, is discharged from measurement unit 960 through pipe 991a.

One end of pipe 991b is connected to nozzle insertion section 982 of cleaning part 980. Another end of pipe 991b is connected to valve 993. The cleaning liquid is discharged from nozzle insertion section 982 to the outside of cleaning reservoir 981 through pipe 991b.

One end of pipe 991c is connected to liquid receiving section 983 of cleaning part 980. Another end of pipe 991c is connected to valve 992. The cleaning liquid is discharged from liquid receiving section 983 to the outside of cleaning reservoir 981 through pipe 991c.

Pipe 991d connects valve 992 to valve 993.

Pipe 991e connects valve 993 to liquid waste storing unit 995. Pipe 991e is provided with pump 994.

Valve 992 is a switching valve to connect either one of pipes 991a and 991c to pipe 991d. In the case where living body specimen 700, the measurement of which is finished in measurement unit 960, is to be discharged from measurement unit 960, valve 992 is switched such that pipe 991a is connected to pipe 991d. In the case where the cleaning liquid is to be discharged from liquid receiving section 983 of cleaning part 980, valve 992 is switched such that pipe 991c is connected to pipe 991d.

Valve 993 is a switching valve to connect either one of pipes 991d and 991b to pipe 991e. In the case where the liquid sent from pipe 991d is to be discharged to pipe 991e, valve 993 is switched such that pipe 991d is connected to pipe 991e. In the case where the cleaning liquid sent from pipe 991b is to be discharged to pipe 991e, valve 993 is switched such that pipe 991b is connected to pipe 991e.

Pump 994 can apply a negative pressure to a portion, except transfer unit 996, located upstream of the pumps in fluid circuit section 990. The liquid transferred due to the negative pressure of pump 994 is transferred to liquid waste storing unit 995 through pipe 991e.

Transfer unit 996 is provided in order to transfer liquid waste 520, which is the used cleaning liquid produced due to the operation of testing apparatus 900, through opening portion 15 of disposal container 10 installed to installation part 910. Transfer unit 996 makes it possible to store with ease liquid waste 520 in disposal container 10.

Transfer unit 996 is provided with discharge pipe 996a to discharge liquid waste 520. Discharge pipe 996a is formed from a pipe-shaped member such as an elastically deformable tube. Discharge pipe 996a is provided below a lower end portion of overflow liquid collection section 984 of cleaning part 980. Discharge pipe 996a is arranged at a position of the same height as that of opening portion 15, in the state where disposal container 10 installed to installation part 910 is stored in testing apparatus 900. Liquid waste 520 flows through the inside of discharge pipe 996a due to its own weight. Thus, it is possible to transfer with ease the cleaning liquid transferred from discharge pipe 996a to the inside of disposal container 10 through opening portion 15. Incidentally, discharge pipe 996a may be, for example, a pipe-shaped metal member, which does not experience elastic deformation.

End 996b of discharge pipe 996a is arranged while being fixed to testing apparatus body 900b. End 996b of discharge pipe 996a is inserted into opening portion 15 when installation part 910 is brought to the closed state of being closed to testing apparatus body 900b from the open state of being opened to testing apparatus body 900b. This makes it possible to insert with ease end 996b of discharge pipe 996a into opening portion 15 only by closing installation part 910 installed with disposal container 10. As described above, end 996b of discharge pipe 996a which transfers liquid waste 520 is inserted into opening portion 15. Thereby, it is possible to store liquid waste 520 inside disposal container 10.

End 996b of discharge pipe 996a is arranged at a position of the same height as that of opening portion 15. End 996b of discharge pipe 996a is arranged inside disposal container 10 through opening portion 15 in the state where disposal container 10 installed to installation part 910 is installed to testing apparatus 900. End 996b of discharge pipe 996a is not in contact with inner surface 10c of disposal container 10 in the state where installation part 910 installed with disposal container 10 is closed to testing apparatus body 900b. This makes it possible to reliably transfer the cleaning liquid transferred from discharge pipe 996a to the inside of disposal container 10.

As a rule, no overflow occurs in cleaning part 980 while testing apparatus 900 is in normal operation because liquid waste 520 is appropriately discharged through pipes 991b and 991c. However, when dispensing part 950 is being cleaned, there may be a case where liquid waste 520 overflows from liquid receiving section 983 of cleaning part 980. Even in the case, for example, where valve 992 in fluid circuit section 990 does not function properly and the cleaning liquid as liquid waste 520 received in liquid receiving section 983, out of the cleaning liquid supplied from the inside of nozzle 951 inserted into nozzle insertion section 982, cannot be transferred to liquid waste storing unit 995, it is possible to transfer liquid waste 520 to the inside of disposal container 10 through overflow liquid collection section 984 and transfer unit 996. Likewise, even in the case where at least one of pipes 991b to 991e, valve 993, and pump 994 in fluid circuit section 990 does not function properly, it is possible to transfer liquid waste 520 flowed to overflow liquid collection section 984 to the inside of disposal container 10 through transfer unit 996.

In the analyzer of Patent Literature 1 described above, there may be a case where liquid waste is produced due to the operation of the analyzer. In this case, it is desired to collect test strips and the liquid waste together in one place and then to easily dispose of the collected test strips and liquid waste.

The embodiments described above can collect the test pieces and the liquid waste together in one place, and to easily dispose of the collected test pieces and liquid waste.

It should be noted that the embodiment disclosed above is illustrative in all respects and is not restrictive. The scope of the invention is presented not by the description of the embodiment described above, but by the claims, and moreover includes all modifications with equivalent meanings to and within the claims.

The invention claimed is:

1. A disposal container for a testing apparatus comprising: a disposal container body comprising:
   a first opening portion opening upward to receive a used test piece dropped by a test piece transfer part of the testing apparatus, wherein the test piece transfer part is configured to transfer the used test piece to the first opening portion;
   a second opening portion, formed such that a lower end portion of the second opening portion is formed at a position higher than a center level in a vertical height on a side surface of the disposal container body, the second opening portion opening laterally to receive a liquid waste and into which an end of a discharge pipe of the testing apparatus is inserted, wherein the discharge pipe is configured to transfer the liquid waste to the second opening portion,
   a first pair of lateral walls provided to oppose to each other;
   a second pair of lateral walls, having a shorter width than the first pair of lateral walls, provided to oppose to each other; and
   a bottom wall connected to lower ends of the first and second pairs of lateral walls; and
   a cover portion connected to an upper end of the other side of the first pair of lateral walls and which is capable of covering the first opening portion and the second opening portion,
wherein
   the first opening portion is provided at a position opposed to the bottom wall, and
   the second opening portion is provided in one side of the first pair of lateral walls,
   a transparent or semi-transparent window portion is provided in the other side of the first pair of lateral walls,
   the window portion and the second opening portion are formed in positions not overlapping each other as viewed in a direction orthogonal to the one side of the first pair of lateral walls,
   the cover portion is capable of being bent to the other side of the first pair of lateral walls so as to cover the first opening portion and the second opening portion, and
   the cover portion includes a cutout portion, which is formed so as to not cover the window portion in a state of being bent to the other side of the first pair of lateral walls.

2. The disposal container according to claim 1, wherein in a plan view, the window portion and the second opening portion are arranged at positions diagonal to each other.

3. The disposal container according to claim 1, wherein the one of the first pair of lateral walls is provided with a first engagement portion, and
the cover portion is provided with a second engagement portion which is configured to engage with the first engagement portion.

4. The disposal container according to claim 1, wherein the disposal container is formed of a paper.

5. The disposal container according to claim 1, wherein the second opening portion is formed at an upper corner of the one side of the first pair of lateral walls.

6. The disposal container according to claim 1, wherein the window portion is formed extending from a vicinity of the bottom wall to a position higher than a lower end of the second opening portion.

7. The disposal container according to claim 1, wherein an outer surface of the disposal container body is covered with a waterproof first resin sheet.

8. The disposal container according to claim 7, wherein an inner surface of the disposal container body is covered with a waterproof second resin sheet, and
a part of the second resin sheet that covers an inner bottom surface of the disposal container body includes a hole which exposes the inner bottom surface.

9. The disposal container according to claim 1, wherein the cover portion is formed integrally with the disposal container body.

* * * * *